Sept. 13, 1960          G. K. HELLER          2,952,807
SPEED INDICATOR
Filed Sept. 13, 1956
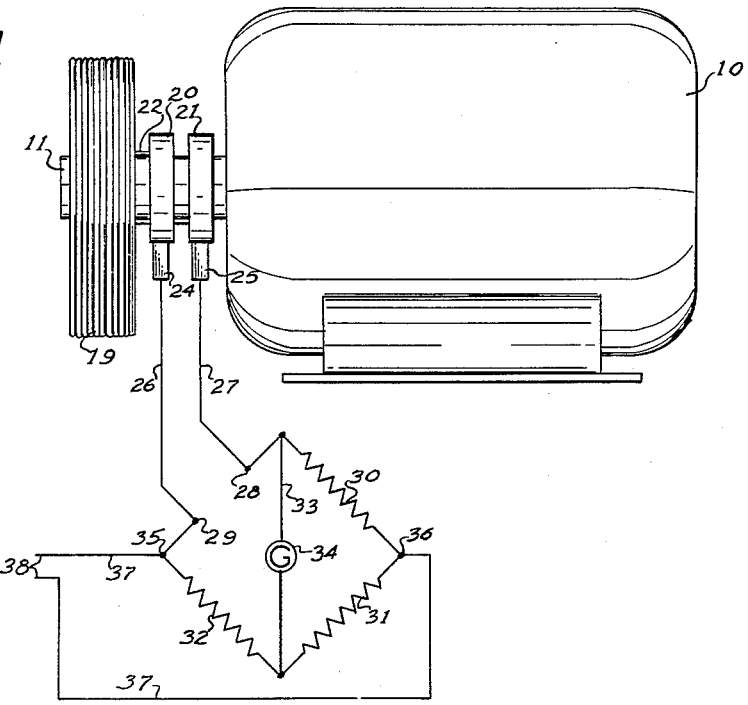
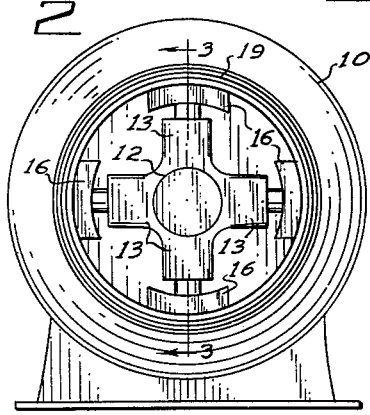
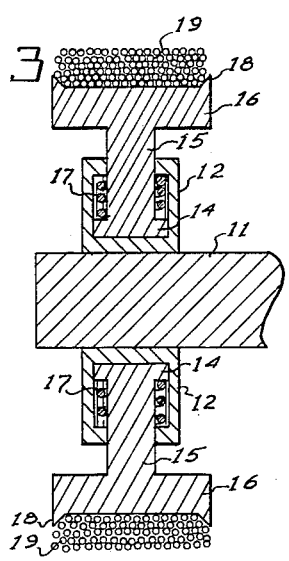
INVENTOR.
GERALD K. HELLER
BY
ATTORNEY United States Patent Office 2,952,807
Patented Sept. 13, 1960

2,952,807
SPEED INDICATOR
Gerald K. Heller, Baltimore, Md.
(2673 S. Western St., Las Vegas, Nev.)
Filed Sept. 13, 1956, Ser. No. 609,591
20 Claims. (Cl. 324—70)

This invention relates to speed indicators and is particularly concerned with electrical means for and method of determining the rotative speed of rotary equipment.

It has long been known that the conductivity of electrical conductors varies in accordance with the tension applied thereto, hence this phenomenon is widely used in strain gauges wherein lineal strain is applied to one or more flights of members which are attached at opposite ends to relatively moving portions of an instrument through which the tension is to be determined. In use, such strain gauges have been found to be both sensitive and accurate and are capable of determining the strain through solid bodies where the surfaces to which the ends of the strain gauges are attached have no apparent motion under stress. However, this principle has not heretofore been applied in measuring the speed of rotating bodies. Heretofore, measurements of speed of rotation have for the most part been limited to mechanical devices. However, it has been noted that centrifugal force will induce a strain in rotating coils, and it is therefore now proposed to measure such strain through the determination of the change in resistance caused by such strain. Since the strain is a direct factor of the speed of rotation, it follows that the speed of rotation may be determined by a determination of the change in resistance.

It is therefore among the primary objects of the present invention to provide a novel and improved means for and method of determining the speed of rotation of a rotating body. More particularly, it is an object of the invention to provide a method of and means for determining rotative speeds by use of the strain caused by centrifugal force in an electrical conductor rotating with the rotating body.

It is a further object of the present invention to provide a method of and means for adapting the principle of a strain gauge to the determination of rotative speed of a rotating body.

A further object of the present invention is to provide a method of and means for determining the rotative speed of electric motors and like rotary devices by the application of a rotating conductor moving therewith and subject to strain in proportion to the speed of rotation and hence responsive in their conductivity to such speeds of rotation.

Numerous other objects, features and advantages of the present invention will be apparent from consideration of the following specification taken in conjunction with the accompanying drawings, in which:

Fig. 1 is a side elevation of an electric motor to which is applied one form of a speed responsive resistance varying coil showing a circuit by which the speed may be determined.

Fig. 2 is an end elevation of that form of the invention shown in Fig. 1.

Fig. 3 is a vertical cross-sectional view taken on the line 3—3 of Fig. 2.

While the principle of the present invention both as to method and as to structure may be variously carried out in forms dependent upon the individual problems involved and the structures with respect to which rotation is to be measured, the method of the present invention may be broadly defined as including the steps of rotating a conductor at a speed proportional to the speed of rotation which is to be determined and in such manner as to be subjected to centrifugal force appropriate to its speed of rotation, whereby the conductor will be subject to strain corresponding to its speed of rotation, passing an electric current through the conductor as it is rotated and determining the change in the current flowing in the conductor due to change in conductivity of said conductor as a result of the strain therein caused by the stress applied thereto through the centrifugal force exerted by virtue of such rotation. In that form of apparatus here presented by way of illustration, the conductor is shown as a coil of wire attached to the shaft with respect to which speed of rotation is to be determined, and here shown as the shaft of an electric motor. Slip rings are mounted on the shaft adjacent the coil so that current may be passed through the coil and the varying conductivity or resistance of the coil may be determined by the use of a conventional Wheatstone bridge, one leg of which includes the coil so that variations in the conductivity of the coil in response to its speed of rotation may be determined by noting the change of current flow across the bridge. In this presently disclosed structure, the coil is wound upon radially movable yieldable plunger supported in a spider fixed to the motor shaft. Since the heads of the plungers engaging the inner turns of the coil have some weight, and hence move centrifugally outward, they produce a greater strain in the coil than that which is produced purely by centrifugal force in the coil itself. However, it is to be clearly understood that the invention is not limited nor restricted to the application of centrifugal force to the conductor by means other than by the mere rotation of the conductor itself. Hence the centrifugal force of the conductor alone may be adequate. Furthermore, the invention is not limited to a coil composed of a plurality of turns, but a single helix or only a fragment thereof may be employed, or the sensing means may be a straight bar rotated with the shaft.

Referring now more particularly to the drawings, in the illustrated form of the structure of the present invention a conventional electric motor 10 is shown. The motor 10 is, of course, merely representative of any equipment the speed of rotation of which is to be determined. On the shaft 11 of the motor 10 there is secured a spider 12 having four radially extending cylindrical spokes 13 which as shown in the cross-sectional view of Fig. 3 receive therein the headed inner ends 14 of centrifugally responsive shaft 15, the outer ends of which mount coil supporting shoes 16. Within each spider spoke 13, a light coil spring 17 is disposed to bear against the outer face of the heads 14 in order to maintain the shafts normally in inward position and to but lightly resist outward movement thereof by centrifugal force. The outer face of the shoes 16 may be formed with side flange elements 18, and therebetween there is wound a coil 19 through which current is to be supplied and which will vary as to its resistance in direct proportion to the speed of rotation of the shaft and the centrifugal force applied to the coil, both by the shoe 16 and by the rotation of the coil itself.

Also mounted on the shaft 11 is a pair of electrically spaced slip rings 20 and 21, one of which is joined by the conductor 22 to the inner turn of the coil while the other is joined by a conductor 23 to the outer turn of the coil. Fixed brushes 24 and 25 are mounted as by the motor housing to engage the slip rings 20 and 21, respectively. The brushes 24 and 25 are connected by conductors 26 and 27, respectively, to contact points 28 and 29 of a Wheatstone bridge which includes the equal and balanced resistances 30, 31 and 32 and the cross circuit arrangement indicated at 33 including a galvanometer 34. As in conventional practice it will be understood that the contact points 35 and 36 of the bridge are connected through conductors 37 with a source of potential indicated at 38. In this arrangement it will be understood that the normal resistance of the coil is of resistance equal to that of the Wheatstone bridge resistances 30, 31 and 32 and hence with the motor idle there will be no current flow through the galvanometer 34.

In the operation of the device, as the motor 10 is energized and the shaft 11 rotated, the resistance in the coil 19 will increase in proportion to the rotary speed since centrifugal force will act on the conductor of the coil to place the coil under stress and the resulting strain will increase the resistance of the coil. It will, of course, be understood that since the coil constitutes the fourth resistance of the bridge, any increase in the resistance of the coil will overbalance the resistance of the fixed resistances 32 and hence current will flow through the gauge in direct proportion to the variations of resistance in the coil.

From the foregoing it is believed that the method of the present invention will be clearly understood. This method includes the step of disposing a conductor in centrifugal force responsive position with respect to a device the speed of rotation of which is to be measured, and the measurement of varying resistances in such conductor as responsive to the centrifugal force applied thereto, and thus the speed of rotation may be instantly and accurately determined. In the practice of the invention it will, of course, be understood that while the resistivity of the coil may be measured by mechanisms such as the bridge here indicated, the invention is not limited to any such measuring means; and, if desired, current may be passed through the coil and a simple ammeter may be employed for determining variations in resistance.

Thus, in the practice of the invention both as to the method and as to the structure thereof numerous changes, modifications and the full use of equivalents may be resorted to without departure from the spirit or scope of the invention as defined in the appended claims.

I claim:

1. In a speed indicator, a continuous rotatable element the speed of rotation of which is to be determined, an electrical conductor mounted directly on said element for rotation therewith to the radial be subjected to centrifugal force on the element, said force being proportional to the speed of rotation, and means for determining variations of conductivity due to strain of said conductor under the influence of stress applied by said force.

2. In a speed indicator, a continuous rotatable element the speed of rotation of which is to be determined, an electrical conductor mounted directly on said element for rotation therewith to be subjected to the radial centrifugal force on the element, said force being proportional to the speed of rotation, and means for determining variations of conductivity due to strain of said conductor under the influence of stress applied by said force, said means including a Wheatstone bridge arrangement.

3. In a speed indicator, a continuous rotatable element the speed of rotation of which is to be determined, an electrical conductor mounted directly on said element for rotation therewith to be subjected to the radial centrifugal force on the element, said force being proportional to the speed of rotation, and means for determining variations of conductivity due to strain of said conductor under the influence of stress applied by said force, said means including a Wheatstone bridge and slip rings on said rotary member.

4. In a speed indicator, a continuous rotatable element the speed of rotation of which is to be determined, an electrical conductor mounted directly on said element for rotation therewith to be subjected to the radial centrifugal force on the element, said force being proportional to the speed of rotation, and means for determining variations of conductivity due to strain of said conductor under the influence of stress applied by said force, said means including a Wheatstone bridge and slip rings on said rotary member together with stationary brushes.

5. In a speed indicator, a continuous rotatable element the speed of rotation of which is to be determined, an electrical conductor coil mounted directly on said element for rotation therewith to be subjected to the radial centrifugal force on the element, said force being proportional to the speed of rotation, and means for determining variations of conductivity due to strain of said coil under the influence of stress applied by said force, said means including a Wheatstone bridge and slip rings on said rotary member together with stationary brushes and conductors leading from said brushes to insert the resistance of said coil in one leg of an otherwise balanced bridge.

6. Means for determining the speed of rotation of a continuous rotatable part including a coil comprising at least one turn of wire mounted for rotation with said part and being thus subject to radial strain due to centrifugal force, said strain being proportional to the centrifugal force and hence the speed of rotation of the part, and electrical means for determining the change in conductivity of said coil in consequence of said strain.

7. Means for determining the speed of rotation of a continuous rotatable part including a coil comprising at least one turn of wire mounted for rotation with said part and being thus subject to radial strain due to centrifugal force, said strain being proportional to the centrifugal force and hence speed of rotation of the part, and electrical means for determining the change in conductivity of said coil in consequence of said strain, said means including slip rings and brushes.

8. Means for determining the speed of rotation of a continuous rotatable part including a coil comprising at least one turn of wire mounted for rotation with said part and being thus subject to radial strain due to centrifugal force, said strain being proportional to the centrifugal force and hence speed of rotation of the part, and electrical means for determining the change in conductivity of said coil in consequence of said strain, said means including slip rings and brushes, together with a Wheatstone bridge.

9. Means for determining the speed of rotation of a continuous rotatable part including a coil comprising at least one turn of wire mounted for rotation with said part and being thus subject to radial strain due to centrifugal force, said strain being proportional to the centrifugal force and hence the speed of rotation of the part, and electrical means for determining the change in conductivity of said coil in consequence of said strain, said coil being mounted on rotation responsive radially movable plungers.

10. Means for determining the speed of rotation of a continuous rotatable part including a coil comprising at least one turn of wire mounted for rotation with said part and being thus subject to radial strain due to centrifugal force, said strain being proportional to the centrifugal force and hence the speed of rotation of the part, and electrical means for determining the change in conductivity of said coil in consequence of said strain, said coil being mounted on rotation responsive radially movable plungers mounted in a spider carried by said rotary part.

11. A method of determining the rotary speed of a continuously rotatable part which includes the step of passing current through a conductor rotating with said part and subject to radial centrifugal force commensurate with the speed of rotation thereof whereby said force will strain said conductor, and measuring the change in conductivity of said conductor resulting from said strain.

12. A method of determining the rotary speed of a continuous rotatable part which includes the step of affixing a conductor to said part for rotation therewith, passing current through said conductor, and measuring the change of conductivity of said conductor responsive to strain therein resulting from stress applied thereto due to the centrifugal force of its rotation.

13. The method of measuring the speed of rotation of a continuously rotatable shaft which includes the steps of mounting a coil on said shaft for rotation therewith, passing current through said coil, and measuring the resistance to current passage in said coil as it varies in response to radial strain due to centrifugal force applied to said coil.

14. Means for determining the speed of rotation of a continuously rotatable part comprising in combination with said part, a radially movable element, electrical resistance means mounted on said part in a position to be moved radially by said movable element, and means for determining the change in conductivity of said electrical resistance means in response to centrifugal force applied to said element upon rotation of said part.

15. Means for determining the speed of rotation of a continuously rotatable part comprising in combination with said part, a centrifugally expansible means carried by said part, electrical resistance means mounted on said expansible means so as to retard expansion of said expansible means, said expansible means being spaced from the axis of rotation of the part and subject to strain upon rotation of said part, said strain being proportional to centrifugal force and hence proportional to the speed of rotation of the part, and electrical means for determining the change in conductivity of said electrical resistance means in consequence of said strain.

16. Means for determining the speed of rotation of a continuously rotatable part comprising a radially expansible means carried by said part, electrical resistive means mounted on said expansible means so as to retard expansion of said expansible means, said electrical resistive means being subject to strain upon rotation of said part, said strain being proportional to centrifugal force and hence proportional to the speed of rotation of the part, and electrical means for determining the change in conductivity of said electrical resistive means in consequence of said strain, said expansible means including a radially movable plunger.

17. Means for determining the speed of rotation of a continuously rotatable part comprising centrifugally expansible means carried by said part, a coil having at least one turn of wire mounted on said expansible means so as to retard expansion of said expansible means, said coil being subject to strain upon rotation of said part, said strain being proportional to centrifugal force and hence proportional to the speed of rotation of the part, and electrical means for determining the change in conductivity of said coil in consequence of said strain, said centrifugally expansible means including a spider mounted on said part and radially movable plungers mounted in said spider.

18. Means for determining the speed of rotation of a continuously rotatable part comprising centrifugally expansible means carried by said part, a coil having at least one turn of wire mounted on said expansible means so as to retard expansion of said expansible means, said coil being subject to strain upon rotation of said part, said strain being proportional to centrifugal force and hence proportional to the speed of rotation of the part, and electrical means for determining the change in conductivity of said coil in consequence of said strain, said centrifugally expansible means including a spider on said part, radially movable plungers mounted in said spider, said electrical means including a Wheatstone bridge.

19. Means for determining the speed of rotation of a continuously rotatable part comprising centrifugally expansible means carried by said part, a coil having at least one turn of wire mounted on said expansible means so as to retard expansion of said expansible means, said coil being subject to strain upon rotation of said part, said strain being proportional to centrifugal force and hence proportional to the speed of rotation of the part, and electrical means for determining the change in conductivity of said coil in consequence of said strain, said centrifugally expansible means including a spider mounted on said part, radially movable plungers mounted in said spider, said electrical means including a brush, a slip-ring on said part and a Wheatstone bridge connected to said coil through said brush and said slip-ring.

20. A method of determining the speed of rotation of a continuously rotatable part which includes the steps of affixing a movable mass to said part for rotation with said part, subjecting said mass to centrifugal force proportional to the rotation of said part, subjecting an electrical conductor to movement of said mass, passing a current through said conductor, and measuring voltage drop across said conductor.

References Cited in the file of this patent

UNITED STATES PATENTS

| | | |
|---|---|---|
| 2,391,966 | Harrison | Jan. 1, 1946 |
| 2,392,293 | Ruge | Jan. 1, 1946 |
| 2,638,556 | Hausz | May 12, 1953 |
| 2,703,939 | Mead et al. | Mar. 15, 1955 |